(12) United States Patent
Marucheck et al.

(10) Patent No.: US 8,073,976 B2
(45) Date of Patent: Dec. 6, 2011

(54) SYNCHRONIZING CLOCKS IN AN ASYNCHRONOUS DISTRIBUTED SYSTEM

(75) Inventors: Michael J. Marucheck, Bellevue, WA (US); Richard L. Hasha, Seattle, WA (US); Mansoor Mohsin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 12/410,677

(22) Filed: Mar. 25, 2009

(65) Prior Publication Data

US 2009/0248900 A1    Oct. 1, 2009

Related U.S. Application Data

(60) Provisional application No. 61/040,118, filed on Mar. 27, 2008.

(51) Int. Cl.
*G06F 15/16* (2006.01)
*G06F 15/173* (2006.01)

(52) U.S. Cl. ............. 709/248; 709/223; 709/224

(58) Field of Classification Search ............ 709/248, 709/223, 224; 713/375–440

See application file for complete search history.

(56) References Cited

U.S. PATENT DOCUMENTS

| | | | | |
|---|---|---|---|---|
| 4,815,110 A * | 3/1989 | Benson et al. | ...... | 375/356 |
| 5,041,966 A * | 8/1991 | Nakai et al. | ...... | 713/375 |
| 5,276,659 A * | 1/1994 | Kotaki | ...... | 368/10 |
| 5,402,424 A * | 3/1995 | Kou | ...... | 370/324 |
| 5,566,180 A * | 10/1996 | Eidson et al. | ...... | 370/473 |
| 5,689,688 A * | 11/1997 | Strong et al. | ...... | 713/375 |
| 5,790,805 A * | 8/1998 | Bantum | ...... | 709/248 |
| 5,907,685 A * | 5/1999 | Douceur | ...... | 709/248 |
| 6,128,318 A * | 10/2000 | Sato | ...... | 370/503 |
| 6,185,217 B1 * | 2/2001 | Ando et al. | ...... | 370/403 |
| 6,199,169 B1 * | 3/2001 | Voth | ...... | 713/400 |
| 6,278,710 B1 | 8/2001 | Eidson | | |
| 6,502,141 B1 * | 12/2002 | Rawson, III | ...... | 713/375 |
| 6,654,356 B1 * | 11/2003 | Eidson et al. | ...... | 370/303 |
| 6,801,876 B2 * | 10/2004 | Barney et al. | ...... | 702/178 |
| 6,898,642 B2 * | 5/2005 | Chafle et al. | ...... | 709/248 |
| 7,020,722 B2 * | 3/2006 | Sivier et al. | ...... | 709/248 |
| 7,023,884 B2 * | 4/2006 | Chuah et al. | ...... | 370/507 |
| 7,047,435 B2 * | 5/2006 | Liou et al. | ...... | 713/500 |
| 7,062,528 B2 * | 6/2006 | Deguchi | ...... | 709/203 |
| 7,072,432 B2 * | 7/2006 | Belcea | ...... | 375/356 |

(Continued)

OTHER PUBLICATIONS

Locher, Thomas, "Oblivious Gradient Clock Synchronization", 2006, 14 pages.

(Continued)

*Primary Examiner* — Karen Tang
(74) *Attorney, Agent, or Firm* — Workman Nydegger (57) ABSTRACT

The present invention extends to methods, systems, and computer program products for synchronizing clocks in an asynchronous distributed system. Embodiments of the invention facilitate creation of a trustable and practical common time (time of day) reference across a set of peer nodes (observers), such as, for example, members within a common asynchronous (distributed) system. A class of pseudo synchronous system can be created via tracking and accumulating worst case relativistic time skews amongst pairs of nodes (observers), without reference to a common master. As such, cooperating nodes can essentially guarantee a lower bound on the time-of-day that one node will observe, given an observation on another node. Accordingly, embodiments of the invention can be applied to provide a consistent (essentially safe) view of the worst case (i.e., greatest variance in) current time across such an asynchronous system—without a common external time-of-day clock entity being used.

22 Claims, 5 Drawing Sheets

U.S. PATENT DOCUMENTS

| | | | |
|---|---|---|---|
| 7,111,195 B2* | 9/2006 | Berkcan et al. | 714/12 |
| 7,184,449 B2* | 2/2007 | Spalink | 370/508 |
| 7,231,338 B2* | 6/2007 | Cavanagh et al. | 703/16 |
| 7,239,581 B2* | 7/2007 | Delgado et al. | 368/10 |
| 7,257,133 B2* | 8/2007 | Jeske et al. | 370/507 |
| 7,260,653 B2* | 8/2007 | Le Scolan et al. | 709/248 |
| 7,272,720 B2* | 9/2007 | Hasebe et al. | 713/178 |
| 7,283,568 B2* | 10/2007 | Robie et al. | 370/503 |
| 7,349,512 B2 | 3/2008 | Rausch et al. | |
| 7,441,048 B2* | 10/2008 | Arnold et al. | 709/248 |
| 7,529,653 B2* | 5/2009 | Frankel et al. | 703/13 |
| 7,570,669 B2* | 8/2009 | Malloy et al. | 370/516 |
| 7,720,110 B2* | 5/2010 | Spalink | 370/516 |
| 7,787,438 B2* | 8/2010 | Dowse | 370/350 |
| 7,805,763 B2* | 9/2010 | Abu-Amara | 726/25 |
| 7,895,265 B2* | 2/2011 | Deguchi | 709/203 |
| 2001/0050903 A1* | 12/2001 | Vanlint | 370/252 |
| 2002/0078243 A1 | 6/2002 | Rich | |
| 2002/0120416 A1* | 8/2002 | Liu et al. | 702/79 |
| 2002/0143998 A1* | 10/2002 | Rajagopal et al. | 709/248 |
| 2002/0152271 A1* | 10/2002 | Chafle et al. | 709/204 |
| 2003/0152110 A1* | 8/2003 | Rune | 370/509 |
| 2004/0215992 A1 | 10/2004 | Anderson | |
| 2005/0228902 A1 | 10/2005 | Leinhart | |
| 2006/0080575 A1 | 4/2006 | Golparian | |
| 2007/0058564 A1* | 3/2007 | Agrawala et al. | 370/252 |
| 2008/0112439 A1* | 5/2008 | Vestal | 370/516 |
| 2008/0151771 A1* | 6/2008 | Dowse | 370/252 |

OTHER PUBLICATIONS

Guang, Cheng, et al., "A Relative Time Model in a Distributed Network using Exchanged Time Information", 2004 IEEE, pp. 382-387.

Schenato, Luca, et al., "A distributed consensus protocol for clock synchronization in wireless sensor network", 2007, 8 pages.

* cited by examiner

SYNCHRONIZING CLOCKS IN AN ASYNCHRONOUS DISTRIBUTED SYSTEM

CROSS-REFERENCE TO RELATED APPLICATIONS

This application claims the benefit of U.S. Provisional Application No. 61/040,118, entitled "Synchronizing Clocks in an Asynchronous Distributed System", filed on Mar. 27, 2008, which is incorporated herein in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Networks have in fact become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In order to communicate over a network, one computing system (referred to herein as a "sending computing system") constructs or otherwise accesses an electronic message and transmits the electronic message over a network to another computing system (referred to herein as a "receiving computing system"). The electronic message may be read by a human user as when the electronic message is an e-mail or instant message, or may be read, instead, by an application running on the receiving computing system. The electronic message may be constructed by an application running on the sending computing system with the possible assistance of a human user.

Within a distributed computing environment, a number of different nodes can interoperate to perform desired computing operations. Appropriate performance of computing operations can often depend on various different nodes having some common understanding of time among one another. Many systems utilize a "master" clock that nodes can refer to obtain an absolute time that is commonly distributed to all the nodes. However, synchronizing clocks to absolute times requires a synchronization protocol and high connectivity. Clock synchronization through reference to a master clock also results in potential choke points and central points of failure. On some networks, such as, for example, the Internet, high connectivity is virtually impossible since computer systems frequently connect to and disconnect from the network.

Some peer-to-peer systems use periodic synchronizations with a common time-of-day clock source to achieve pseudo synchronous behavior. Thus, these systems also have a common temporal master which must exist and be available at certain moments (e.g., new member joining) in order to have a trusted and safe system.

BRIEF SUMMARY

The present invention extends to methods, systems, and computer program products for synchronizing clocks in an asynchronous distributed system. In some embodiments, the variance between what an observing computer system purports the time at a different observed computer system to be and the actual (local) time at the observed computer system is determined. The observing computer system participates in at one or more message exchanges with the observed computer system.

A message exchange includes the observing computer system recording the send time of the clock at the observing computer system when a message is sent. A message exchange includes the observing computer system sending one or more messages to the observed computer system. A message exchange includes the observing computer system subsequently receiving correlatable messages responsive to the message from the observed computer system. The correlatable message contains a time from the observed computer system—its local time. A message exchange includes the observing computer system recording the received time of the (local) clock at the observing computer system when the correlatable message is received. A message exchange includes the observing computer system recording the local time of the observed computer system when the correlatable message is received.

The observing computer system calculates a lower bound for the time at the observed computer system relative to the local time of the observing computer system based on the difference between that local time recorded for sending the message and the time from the observed computer system included in the correlatable message, the clock quantum constraint, and the clock drift constraint. The observing computer system calculates an upper bound for the time at the observed computer system relative to the time of the observing computer system based on the difference between the local time recorded for receiving the correlatable message and the time from the observed computer system included in the correlatable message, the clock quantum constraint, and the clock drift constraint.

The observing computer system calculates the difference between the upper bound and the lower bound. The observing computer system calculates the maximum variance between what the observing computer system purports the time at the observed computer system to be and the actual time at the observed computer system by dividing the calculated difference by an averaging factor, such as, for example, dividing the calculated difference in half Subsequent message exchanges can be utilized to further refine lower and upper bounds. An observing computer system can calculate a time range indicative of when an event occurred at the observed computer system based on the lower and upper bound.

In other embodiments, the maximum variance between clocks at different computer systems of an asynchronous distributed system that includes a plurality of computer systems is calculated. The computer system accessing a clock quantum constraint. The clock quantum constraint indicates the maximum difference between clock quantizations among the computer systems of the asynchronous distributed system. The computer system accesses a drift rate constraint. The drift rate constraint indicates the maximum clock drift within a specified period of time for each computer system of the asynchronous distributed system.

The computer system accesses a maximum round trip constraint. The maximum round trip constraint indicates the maximum amount of time for a request/reply message exchange to occur between any two computer systems of the asynchronous distributed system. The computer system calculates the maximum variance between clocks at different computer systems of the asynchronous system based on the clock quantum constraint, the drift rate constraint, and the maximum round trip constraint.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for synchronizing clocks in an asynchronous distributed system In some embodiments, the variance between what an observing computer system purports the time at a different observed computer system to be and the actual (local) time at the observed computer system is determined. The observing computer system participates in at one or more message exchanges with the observed computer system.

A message exchange includes the observing computer system recording the send time of the clock at the observing computer system when a message is sent. A message exchange includes the observing computer system sending one or more messages to the observed computer system. A message exchange includes the observing computer system subsequently receiving correlatable messages responsive to the message from the observed computer system. The correlatable message contains a time from the observed computer system—its local time. A message exchange includes the observing computer system recording the received time of the (local) clock at the observing computer system when the correlatable message is received. A message exchange includes the observing computer system recording the local time of the observed computer system when the correlatable message is received.

The observing computer system calculates a lower bound for the time at the observed computer system relative to the local time of the observing computer system based on the difference between that local time recorded for sending the message and the time from the observed computer system included in the correlatable message, the clock quantum constraint, and the clock drift constraint. The observing computer system calculates an upper bound for the time at the observed computer system relative to the time of the observing computer system based on the difference between the local time recorded for receiving the correlatable message and the time from the observed computer system included in the correlatable message, the clock quantum constraint, and the clock drift constraint.

The observing computer system calculates the difference between the upper bound and the lower bound. The observing computer system calculates the maximum variance between what the observing computer system purports the time at the observed computer system to be and the actual time at the observed computer system by dividing the calculated difference by an averaging factor, such as, for example, dividing the calculated difference in half Subsequent message exchanges can be utilized to further refine lower and upper bounds. An observing computer system can calculate a time range indicative of when an event occurred at the observed computer system based on the lower and upper bound.

In other embodiments, the maximum variance between clocks at different computer systems of an asynchronous distributed system that includes a plurality of computer systems is calculated. The computer system accessing a clock quantum constraint. The clock quantum constraint indicates the maximum difference between clock quantizations among the computer systems of the asynchronous distributed system. The computer system accesses a drift rate constraint. The drift rate constraint indicates the maximum clock drift within a specified period of time for each computer system of the asynchronous distributed system.

The computer system accesses a maximum round trip constraint. The maximum round trip constraint indicates the maximum amount of time for a request/reply message exchange to occur between any two computer systems of the asynchronous distributed system. The computer system calculates the maximum variance between clocks at different computer systems of the asynchronous system based on the clock quantum constraint, the drift rate constraint, and the maximum round trip constraint.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Within this description and the following claims, quantized is defined as not being continuous, that is, holding a value for a certain duration (e.g., one second) and then changing to a new value.

Within this description and the following claims, drift is defined as one clock not running at the exact speed compared to another clock. Thus, after some amount of time one clock can "drift apart" from another clock. Clocks can drift in different directions (e.g., either falling behind or moving ahead relative to another clock) and can drift at different speeds. The drift of an individual clock can also vary at different times in response to environmental changes, such as, for example, changes in surrounding temperature, battery power, etc.

Generally, clocks within an asynchronous system can conform with one or more constraints. For example, real computer clocks can be constrained to pass time very closely to the same rate (as measured by advancement of their local clock values). Thus, the (relatively small and potentially insignificant) inaccuracies in the mechanics of clocks can be compensated for in a worst case manner. Accordingly, embodiments of the invention utilize an algorithm that considers such constraints such that a subject observer can collaborate with other observers to establish relatively strong bounds on the value of other observers' clocks at a given time from the subject observer's point of view (even though that subject observer cannot observe those other clocks directly).

Accordingly, embodiments of the invention can be implemented to provide a relatively consistent (safe) view of the worst case (e.g., greatest variance in) current time across an asynchronous system—without a common external time-of-day clock entity being used. Computer systems in an asynchronous distributed system have no dependency on a common temporal master and are thus virtually "masterless".

In some embodiments, a subject observer (e.g., a node) can observe the value of a single clock (its clock), and that a set of peer observers (in the same form of our subject observer) can pass asynchronous non-instantaneous messages to other observers, introducing an indeterminate delay through the inter-observer communications path.

Description of some examples of the invention are provided based on the following notations:

1. t0,t1,t2, . . . are specific event indications in a common timeline.

2. (t1−t0) describes the exact duration between two events (t1 and t0).

3. If an event, t0, occurs before another event, t1, then: t0<t1

4. $X(t0)$ is the value of clock X that is observed when event t0 occurs.

3. $(X(t1)-X(t0))$ is the duration value (time span) between two events (t1 and t0) as measured by clock X.

5. $O_X$ defines an observer of clock X.

6. $O_X$.send($O_Y$, {contents}) represents the event of $O_X$ sending a (e.g., a request) message to O with the specified contents.

7. $O_X$.receive($O_Y$, {contents}) represents the event of $O_X$ receiving (e.g., a reply) a message from $O_Y$ with the specified contents.

Thus, within the following asynchronous distributed system constraints:

A. The value of a clock increases monotonically:

if $t0<t1$, then $X(t0)<=X(t1)$

B. There is an upper bound on the clock quantum, Q, such that for any clock X:

if $t0+Q<t1$, then $X(t0)<X(t1)$

C. There is an upper bound on clock drift D, such that for any clock X and events $t0<t1$:

if $t0<t1$, then $(1-D)*(X(t1)-X(t0))<=(t1-t0)+Q$

D. And if $t0<t1$, then $(t1-t0)<=((1+D)*(X(t1)-X(t0)))+Q$

Utilizing the described notations and in an asynchronous distributed system having the described constraints the following message exchange sequence can occur:

@t0: $O_X$ observes $X(t0)$
@t1: $O_X$.send($O_Y$, {X(t0)})
@t2: $O_Y$.receive($O_X$, {X(t0)})
@t3: $O_Y$ observes $Y(t3)$
@t4: $O_Y$.send($O_X$, {X(t0), Y(t3)}
@t5: $O_X$.receive($O_Y$, {X(t0), Y(t3)}
@t6: $O_X$ observes $X(t6)$ The message exchange sequence is that of a request/reply operation where $O_X$ queries $O_Y$ for $O_Y$'s current local clock value, recording when it did so (t0) and when it got the reply back (t6). $O_X$ now knows that Y had the value Y(t3) at some point between the time when X's local clock had the value X(t0) and when X's local clock had the value X(t6). Although the combination of messages can be used to represent a global order, each of $O_X$ and $O_Y$ can operate according to their own independent time line.

In the event of perfect local clocks that do not drift, $O_X$ can establish the following bounds on the value of clock Y at any time t after t6:

$Y(t)>=X(t)-(X(t6)-Y(t3))$ $Y(t)<=X(t)+(Y(t3)-X(t0))$

Accounting for quantization, $O_X$ can establish the following bounds on the value of clock Y at any time t after t6:

$Y(t)>=X(t)-(X(t6)-Y(t3)+2Q)$ $Y(t)<=X(t)+(Y(t3)-X(t0)+2Q)$

The Q term represents that the clocks are quantized. To see that quantization adds two Q term to each of the bounds, suppose an observation had been made such that X(t0)=0, Y(t3)=1, and X(t6)=2. This would suggest that the clocks were in sync with an uncertainty of 2. To find the actual uncertainty, the boundary cases for each of the three clocks that could have led to this observation can be considered:

| X Observes X(t0) | Y Observes Y(t3) | X Observes X(t6) | Maximal negative error | Maximal positive error |
|---|---|---|---|---|
| $0 + \Delta$ | $1 + \Delta$ | $2 + \Delta$ | 1 | 1 |
| $0 + \Delta$ | $1 + \Delta$ | $3 - \Delta$ | 1 | $2 - 2\Delta$ |
| $0 + \Delta$ | $2 - \Delta$ | $2 + \Delta$ | $2 - 2\Delta$ | $2\Delta$ |
| $0 + \Delta$ | $2 - \Delta$ | $3 - \Delta$ | $2 - 2\Delta$ | 1 |
| $1 - \Delta$ | $1 + \Delta$ | $2 + \Delta$ | $2\Delta$ | 1 |
| $1 - \Delta$ | $1 + \Delta$ | $3 - \Delta$ | $2\Delta$ | $2 - 2\Delta$ |
| $1 - \Delta$ | $2 - \Delta$ | $2 + \Delta$ | 1 | $2\Delta$ |
| $1 - \Delta$ | $2 - \Delta$ | $3 - \Delta$ | 1 | 1 |

The first three columns indicate the time of the observation relative to the time when the clock changes to a given value. For example, in the second column, "$2-\Delta$" indicates the time of an event that precedes the event of Y changing its value from 1 to 2. The fourth column is the difference between columns 1 and 2, and the fifth column is the difference between columns 2 and 3.

Taking the maximum values from the last two columns and letting $\Delta$ approach 0, we find that the maximum uncertainty in either direction is 2. Comparing this to the observed uncertainty, quantization has introduced a possible error of 2 quanta. This can be generalized to any X(t0), Y(t3), and X(t6) by observing that changes to these values affect both the observed results and the possible boundary cases identically. Thus, quantization introduces an error term equal to 2Q.

Accounting for quantization and clock drift, $O_X$ can establish the following bounds on the value of clock Y at any time t after t6:

$Y(t)>=X(t)-(X(t6)-Y(t3)+2Q)-2D(X(t)-(X(t6)+X(t0))/2+2Q)$ $Y(t)<=X(t)+(Y(t3)-X(t0)+2Q)+2D(X(t)-(X(t6)+X(t0))/2+2Q)$

The difference between these values is:

$$(X(t) + (Y(t3) - X(t0) + 2Q) + 2D(X(t) - (X(t6) + X(t0))/2 + 2Q)) -$$
$$(X(t) - (X(t6) - Y(t3) + 2Q) - 2D(X(t) - (X(t6) + X(t0))/2 + 2Q)) =$$
$$X(t) - X(t) + Y(t3) - Y(t3) + X(t6) - X(t0) +$$
$$4Q + 4D(X(t) - (X(t6) + X(t0))/2 + 2Q)$$
$$= X(t6) - X(t0) + 4Q + 4D(X(t) - (X(t6) + X(t0))/2 + 2Q)$$

This implies a maximum error of $(X(t6)-X(t0))/2+2Q+2D(X(t)-(X(t6)+X(t0))/2+2Q)$ In this expression, (X(t6)−X(t0)) is the time it takes for the request-reply interaction from $O_X$ to $O_Y$ and back. Q is dependent on how often the clocks' values are updated. The final term, 2D(X(t)−(X(t6)+X(t0))/2+2Q), indicates how the bound becomes weaker over time (i.e., decays) because of potential clock drift.

The message exchange sequence query can be repeated multiple times and $O_X$ can choose the tightest upper bound from any query, and can choose the tightest lower bound from any query. When choosing, the tightest upper bound and tightest lower bound need not come from the same query. By repeating message exchange sequence query periodically, an observer (in this example $O_X$) can minimize the third term, since at any time T there will have been a recent measurement.

Figure 1:
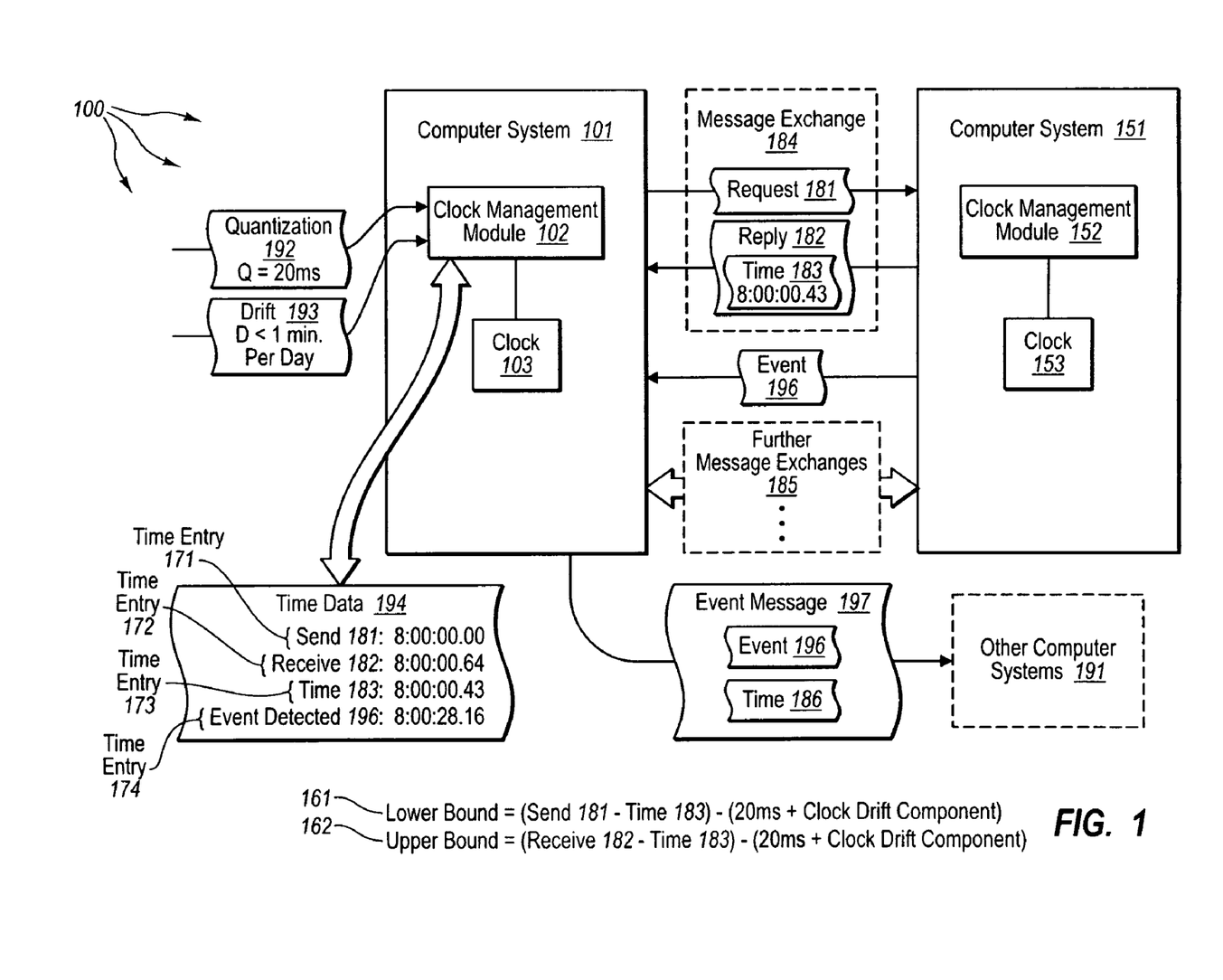
FIG. 1 illustrates an example asynchronous distributed system that facilitates synchronizing clocks in the asynchronous distributed system.

FIG. 1 illustrates asynchronous distributed system 100 that facilitates synchronizing clocks in asynchronous distributed system 100. Referring to FIG. 1, computer architecture 100 includes computer systems 101, 151, and other computer systems 191. Each of the depicted computer systems and their corresponding components can be connected to one another over (or be part of) a communication path, such as, for example, a Local Area Network ("LAN"), a Wide Area Network ("WAN"), Universal Serial Bus (USB), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Asynchronous distributed system 100 can be virtually any type of asynchronous system, such as, for example, a peer-to-peer system.

As depicted, computer system 101 includes clock management module 102 and clock 103. Generally, computer system 101 is configured to participate in request/reply message exchange sequences with other computer systems and maintain a purported time at the observed computer systems based on time data associated with the request/reply message exchange sequences.

Clock management module 102 is configured to record and maintain time data (e.g., time data 194) associated with communication between computer system 101 and other computer systems of asynchronous distributed system 100. Clock management module 102 can record the time at clock 103 when messages are sent from and received at computer system 101. Clock management module 102 can also store times received from observed computer systems (e.g., computer system 151) that are contained in reply messages received as part of a request/reply message exchange sequence. From recorded and received times, clock management module 102 can indicate the time of the occurrence of events at observed computer systems within specified ranges.

As depicted, computer system 151 includes clock management module 152 and clock 153. Generally, computer system 151 is configured to participate in request/reply message exchange sequences with other computer systems and maintain a purported time at the observed computer systems based on time data associated with the request/reply message exchange sequences.

Clock management module 152 is configured to recorded and maintain time data associated with communication between computer system 151 and other computer systems of asynchronous distributed system 100. Clock management module 152 can record the time at clock 153 when messages are sent from and received at computer system 151. Clock management module 152 can also store times received from observed computer systems (e.g., computer system 101) that are contained in reply messages received as part of a request/reply message exchange sequence. From recorded and received times, clock management module 152 can indicate the time of the occurrence of events at observed computer systems within specified ranges.

Embodiments of the present invention include computer systems observing their own clocks and inferring ranges of values for other clocks. For example, computer system 101 can observe clock 103 and can infer a range of values for clock 153 (as well as clocks at other computer systems 191). Similarly, computer system 151 can observe clock 153 and can infer a range of values for clock 103 (as well as clocks at other computer systems 191). Other computer systems 191 can also observe their own clocks and infer a range of values for each of clocks 103 and 153.

Clock management modules can also be configured with a maximum quantization difference Q between clocks in asynchronous distributed system 100 (e.g., quantization 192) and a maximum clock drift per time period D in asynchronous distributed system 100 (e.g., drift 193).

Accordingly, some embodiments of the invention include utilizing request/reply message exchanges to determine the variance between what an observing computer system purports the time at the observed computer system to be and the actual time at the observed computer system. A request/reply message exchange can include a request message and a corresponding reply message. For example, message exchange 184 includes request 181 and reply 182. From a determined variance, an observing computer system can, for example, infer a range of values for a clock at an observed computer system. However, messages with looser correlations (e.g., than express request/reply) can also be used.

Thus, other embodiments of the invention utilize message exchanges with a looser correlation between sent and received messages to determine the variance between what an observing computer system purports the time at the observed computer system to be and the actual time at the observed computer system. For example, one computer can send a plurality of requests and get back a fewer number of or only one corresponding response (e.g., represented by other message exchanges 185). Further, a reply from one computer can also represent a request from the one computer back to another computer. Thus a message can represent both a request and a reply. Additionally, there is often no requirement dictating when a reply to a received request is to be returned. Thus, even when there is a strong correlation between a request/reply pair, there may be no constraints on when a reply is returned. For example, within request/reply 184 there may be no time constraints dictating when reply 182 is returned in response to receiving request 181.

Figure 2:
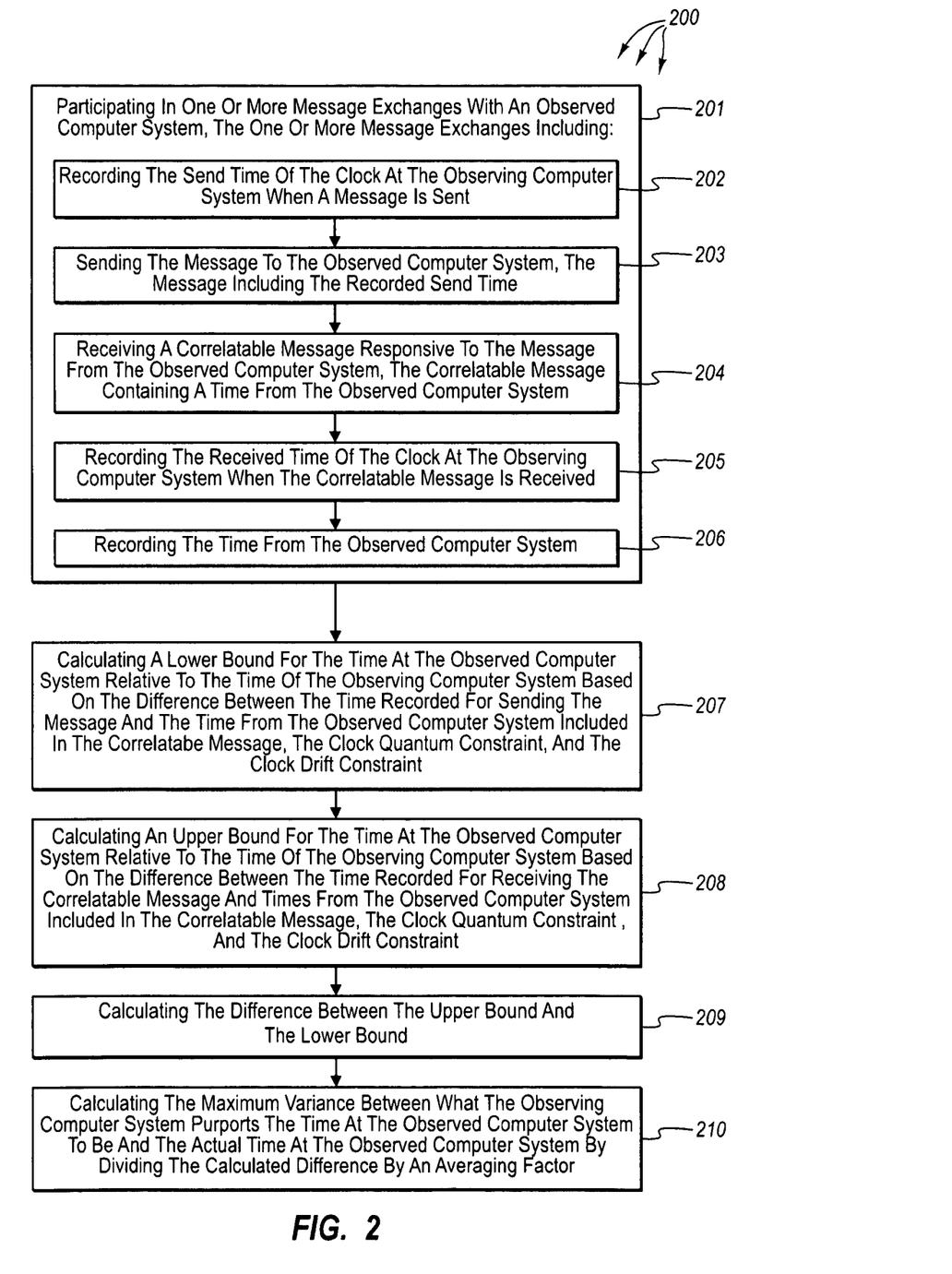
FIG. 2 is a flow chart of an example method for determining the variance between what the observing computer system purports the time at the observed computer system to be and the actual time at the observed computer system.

FIG. 2 is a flow chart of an example method 200 for determining the variance between what the observing computer system purports the time at the observed computer system to be and the actual time at the observed computer system, the method comprising. The method 200 will be described with respect to the components and data in asynchronous distributed system 100.

Method 200 includes an act of participating in a one or more message exchanges with an observed computer system (act 201). For example, computer system 101 can participate in message exchange 184 with computer system 151. Alternately, computer system 101 can participate in one or more further message exchanges 185. The message exchanges can have a looser coupling between requests and replies than message exchange 184. In other embodiments, computer system 101 participates in further message exchanges 185 but does not participate in message exchange 184. Thus, computer system 101 may participate in loosely couple message exchanges that do not include correlated messages of any request/reply message exchanges.

Participation in a one or more message exchanges with an observed computer system can include an act of recording the time of the clock at the observing computer system when a message is sent (act 202). For example, clock management module 102 can record time entry 171 in time data 194. Time entry 171 records the time at clock 103 when computer system 101 sent request 181, for example, in an hh:mm:ss.ms format. Thus, time entry 181 indicates that request 181 was sent when clock 103 indicated a time of 8 o'clock. Alternately or in combination, time entries can also be added for other requests (e.g., requests that are to be included in further message exchanges 185). Participation in one or more message exchanges with an observed computer system can include an act of sending a message to the observed computer system, the message including the recorded send time (act 203). For example, computer system 101 can send request 181 to computer system 151. Request 181 can include the information from time entry 171. Alternately or in combination, one or more other requests (e.g., as part of further message exchanges 185) can also be sent from computer system 101 to computer system 151

Participation in one or more messages exchange with an observed computer system can include an act of subsequently receiving a correlatable messages responsive to the message from the observed computer system, the correlatable message containing a time from the observed computer system (act 204). For example, computer system 101 can receive reply 182 from computer system 151. Reply 182 includes time 183. Time 183 indicates an observed time at clock 153 (e.g., when 182 reply was sent, when request 181 was processed, etc.). Alternately or in combination, one or more other replies can also be received from computer system 151 (e.g., e.g., replies included in further message exchanges 185). Thus, one or more replies can include times indicating observed times at clock 153.

Participation in one or more message exchanges with an observed computer system can include an act of recording the received time of the clock at the observing computer system when the correlatable message is received (act 205). For example, clock management module 102 can record time entry 172 in time data 194. Time entry 172 records the time at clock 103 when computer system 101 received reply 182. Thus, time entry 172 indicates that reply 182 was received when clock 103 indicated a time of 8 o'clock and 64 ms. Alternately or in combination, clock management module 102 can also record time entries (in time data 194) indicating when other replies included further message exchanges 185 were received.

Participation in one or more message exchange with an observed computer system can include an act of recording the time from the observed computer system (act 206). For example, clock management module 102 can record time entry 173 in time data 194. Time entry 173 records the time computer system 151 observed at clock 153 (e.g., receiving request 181, during processing of request 181, etc.). Time entry 173 indicates that the time of clock 153 was observed at 8 o'clock and 43 ms during request/reply exchange sequence 184. Alternately or in combination, clock management module 102 can also record time entries in time data 194) for times contained in other replies included in further message exchanges 185.

Method 200 includes an act of calculating a lower bound for times at the observed computer system relative to times of the observing computer system based on the difference between the times recorded for sending the message and the time from the observed computer system included in the correlatable message (act 207). For example, clock management module 102 can calculate lower bound 161 for the time of clock 103 relative to clock 153. Clock management module 102 can implement the previously described formulas to calculate lower bound 161 on clock 153. Thus, at the time reply 182 is received and clock 103 is observed to read 8:00:00.064 lower bound 161 can be calculated as:

$$\text{Clock } 153 >= 8:00:00.064 - (8:00:00.064 - 8:00:00.043 + 15 \text{ ms}) -$$
$$2(0.0007)(8:00:00.064 - (8:00:00.064 +$$
$$8:00:00.000)/2 + 15 \text{ ms})$$
$$\text{Clock } 153 >= 8:00:00.064 - (21 \text{ ms} + 15 \text{ ms}) -$$
$$0.0014(32 \text{ ms} + 15 \text{ ms})$$
$$\text{Clock } 153 >= 8:00:00.064 - 36 \text{ ms} - 0.07 \text{ ms}$$
$$\text{Clock } 153 >= 8:00:00.027$$

Alternately or in combination, clock management module 102 can also calculate lower bound 161 from time entries related to other request and other replies in further message exchanges 185.

Method 200 includes an act of calculating an upper bound for the time at the observed computer system relative to the time of the observing computer system based on the difference between the time recorded for receiving the correlatable message and the time from the observed computer system included in the correlatable message (act 208). For example, clock management module 102 can calculate upper bound 162 for the time of clock 103 relative to clock 153. Clock management module 102 can implement the previous described formulas to calculate upper bound 161 on clock 153. Thus, at the time reply 182 is received and clock 103 is observed to read 8:00:00.064 upper bound 162 can be calculated as:

$$\text{Clock } 153 <= 8:00:00.064 + (8:00:00.043 - 8:00:00.000 + 15 \text{ ms}) +$$
$$2(0.0007)(8:00:00.064 - (8:00:00.064 +$$
$$8:00:00.000)/2 + 15 \text{ ms})$$
$$\text{Clock } 153 <= 8:00:00.064 + (43 \text{ ms} + 15 \text{ ms}) +$$
$$0.0014(32 \text{ ms} + 15 \text{ ms})$$
$$\text{Clock } 153 <= 8:00:00.064 + 58 \text{ ms} + 0.07 \text{ ms}$$
$$\text{Clock } 153 <= 8:00:00.123$$

Alternately or in combination, clock management module 102 can also calculate upper bound 162 from time entries related to other request and other replies in further message exchanges 185

Method 200 includes an act of calculating the difference between the upper bound and the lower bound (act 209). For example, clock management module 102 can calculate the different between upper bound 162 and lower bound 161. At the time reply 182 is received and accounting for quantization 192, the difference upper bound 162 and lower bound 161 equals approximately 123 ms-27 ms, or 96 ms.

Method 200 includes an act of calculating the maximum variance between what the observing computer system purports the time at the observed computer system to be and the actual time at the observed computer system by dividing the calculated difference by an averaging factor (act 210). For example, clock management module 102 can divide 96 ms by 2 to calculate 48 ms. The midpoint of the offset between clock 103 and 153 is ((8:00:00.027+8:00:00.123)/2)–8:00:00.064, which indicates that clock 153 is approximately 12 ms ahead of Clock 103.

As previously described, alternately or in combination with message exchanges 184, computer system 101 can participate in further message exchanges 185 with computer system 151. Thus, lower and/or upper bounds for an inferred time range can be refined based on these further message exchanges. Thus, lower bound 161 can be refined when any subsequent send time—observed time is less than greater than −43 ms. For example, if send time is 8:01:27.53 and an observed time is 8:01:27.69,lower bound 161 can be refined to—(16 ms+20 ms+clock drift component). Similarly, upper bound 162 can be refined when any subsequent receive time—observed time is less than less than 21 ms. For example, if receive time is 8:03:52.07 and observed time is 8:03:51.92,upper bound 162 can be refined to (15 ms+20 ms+clock drift component).

Both a lower bound and an upper bound can indicate some amount of time that an observing computer system clock lags an observed clock. For example, a lower bound can be −47 ms and an upper bound can be −12 ms. This combination of lower and upper bound indicate that a computer system clock lags an observed clock at least by 12 ms and lags the observed clock by no more than 47 ms.

Similarly, both a lower bound and an upper bound can indicate some amount of time that an observing computer system clock is ahead of an observed clock. For example, a lower bound can be 17 ms and an upper bound can be 82 ms. This combination of lower and upper bound indicate that a computer system clock is ahead of an observed clock by at least 17 ms and is ahead of the observed clock by no more than 82 ms In some embodiments, a clock management module is configured to initiate a request/reply message exchange, or other message exchanges, at least on pre-defined intervals, such as, for example, every minute, every two minutes etc. Message exchanges can be piggybacked on other (e.g., application) messages exchanged between computer systems in an asynchronous distributed system. Request/reply or other message exchanges for clock synchronization can also be initiated in accordance with other policies, such as, for example, crossing a drift limit.

Subsequent to inferring the time at an observed computer system, and observing computer system can use the inferred time to calculate the time bounds from when an event occurred or is likely to (or will) occur at the observed computer system.

Accordingly, embodiments of the invention facilitate a common understanding, or safe view of the passage, of time between two computer systems. For example, from a maximum variance or time range, an observing computer system can formulate a safe view of the passage of time at the observed computer system. From the safe view, an observing computer system can assume (within calculated bounds) when a past event occurred at the observed computer system. For example, computer systems 101 can assume when event 196 occurred at computer system 151. Also from the safe view, the two computer systems can come to an agreement on when an event is to occur in the future. As a result, one computer system can assume (within calculated bounds) when an event will occur at the other computer system.

Figure 3:
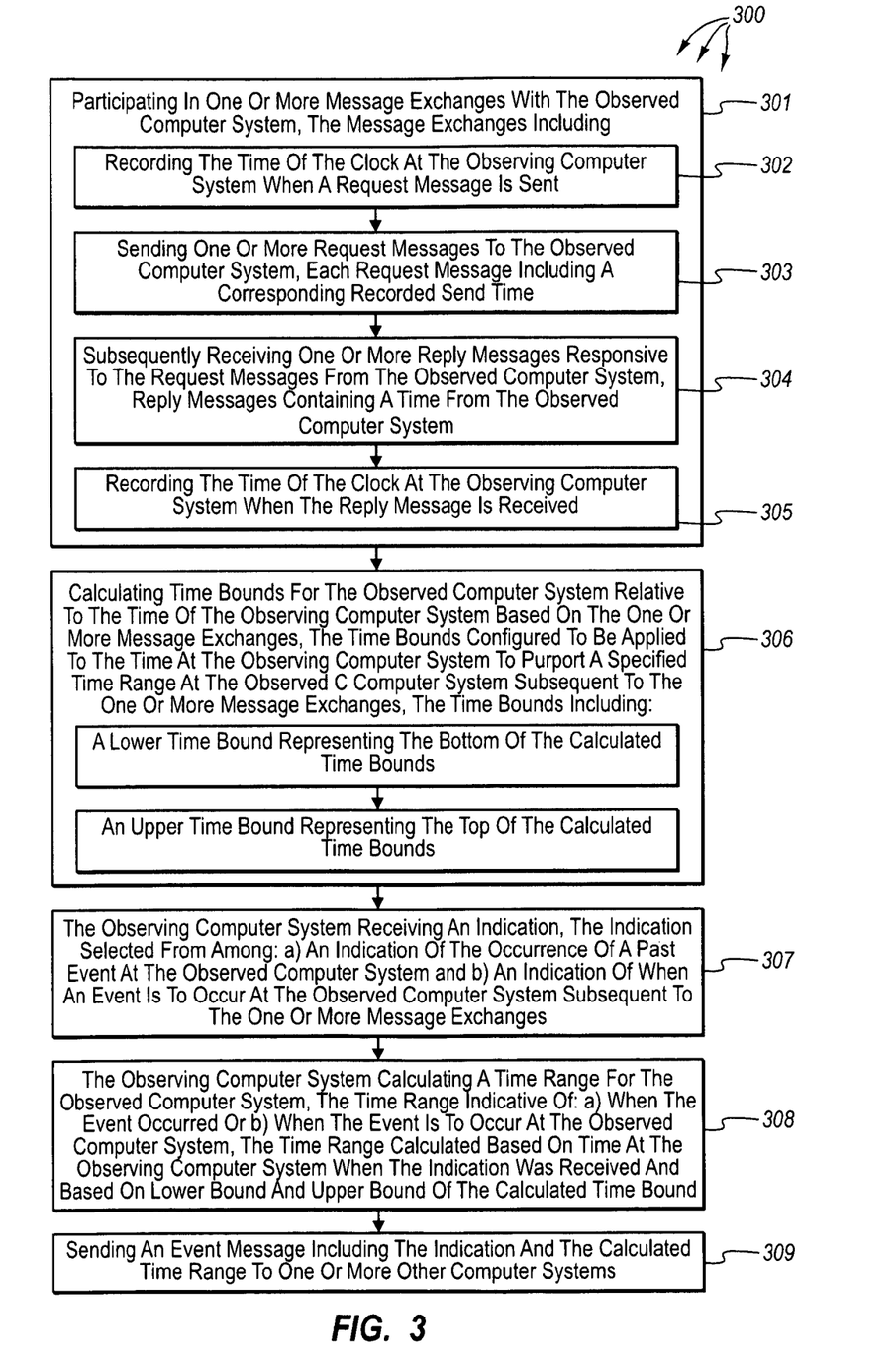
FIG. 3 is a flow chart of an example method for indicating the time an event occurred at an observed computer system.

FIG. 3 is a flow chart of an example method for indicating the time an event occurred at an observed computer system.

Method 300 includes an act of participating in one or more message exchanges with the observed computer system (act 301). Each message exchange includes an act of recording the time of the clock at the observing computer system when a request message is sent (act 302). Each message exchange includes an act of sending one or more request messages to the observed computer system, each request message includes a corresponding recorded send time (act 303). Each message exchange includes an act subsequently receiving one or more reply messages responsive to the request messages from the observed computer system, the reply messages containing a time from the observed computer system (act 304). Each message exchange includes an act of recording the time of the clock at the observing computer system when a reply message is received (act 305).

For example, computer system 101 can participate in message exchange 184 and further message exchanges 185. Each message exchange can include: sending a one or more requests (e.g., 181), recording a time when each request was sent (e.g., 171), receiving one or more replies (e.g., 182), recording the time when each reply was received (e.g., 172), and recording a time (e.g., 183) contained in the reply from the observer computer systems (e.g., 173).

Method 300 includes an act of calculating time bounds for the observed computer system relative to the time of the observing computer system based on the one or more message exchanges, the time bounds configured to be applied to the time at the observing computer system to purport a specified time range at the observed computer system subsequent to the one or more message exchanges (act 306). The time bounds include a lower time bound representing the bottom of the calculated time bounds and an upper time bound representing the top of the calculated time bounds. For example, computer system 101 can calculate and refine lower bound 161 and upper bound 162.

Method 300 includes an act of the observing computer system receiving an indication, the indication selected from among: a) an indication of the occurrence of a past event at the observed computer system and b) an indication of when an event is to occur at the observed computer systems subsequent to the one or more message exchanges (act 307). For example, computer system 101 can detect event 196. Upon receiving event 196, clock management module can record time entry 174 in time data 194. Time entry 194 indicates that event 196 was detected at 8:00:28.016. Alternately, computer system 101 can receive an indication of when an event is to occur at computer system 151 and record a time entry for when the event is to occur.

Method 300 includes an act of the observing computer system calculating a time range for the observed computer system, the time range indicative of a) when the past event occurred or b) when the event is to occur at the observed computer system, the time range calculated based on time at the observing computer system when the indication was received and based on lower bound and upper bound of the calculated time bound (act 308). For example, from time entry 174, clock management module 102 can calculate time range indicating when event 196 occurred at computer system 151. As such the new lower bound can be calculated as:

$$\text{Clock } 153 >= 8{:}00{:}00.064 - (8{:}00{:}00.064 - 8{:}00{:}00.043 + 15 \text{ ms}) -$$
$$2(0.0007)(8{:}00{:}28.016 - (8{:}00{:}00.064 +$$
$$8{:}00{:}00.000)/2 + 15 \text{ ms})$$
$$\text{Clock } 153 >= 8{:}00{:}00.064 - (21 \text{ ms} + 15 \text{ ms}) -$$
$$0.0014(28{,}016 \text{ ms} - 32 \text{ ms} + 15 \text{ ms})$$
$$\text{Clock } 153 >= 8{:}00{:}00.064 - 36 \text{ ms} - 39.2 \text{ ms}$$
$$\text{Clock } 153 >= 7{:}59{:}59.089$$

And the new upper bound can be calculated as:

$$\text{Clock } 153 <= 8{:}00{:}00.064 + (8{:}00{:}00.043 - 8{:}00{:}00.000 + 15 \text{ ms}) +$$
$$2(0.0007)(8{:}00{:}28.016 - (8{:}00{:}00.064 +$$
$$8{:}00{:}00.000)/2 + 15 \text{ ms})$$
$$\text{Clock } 153 <= 8{:}00{:}00.064 + (43 \text{ ms} + 15 \text{ ms}) +$$
$$0.0014(32 \text{ ms} + 15 \text{ ms})$$
$$\text{Clock } 153 <= 8{:}00{:}00.064 + 58 \text{ ms} + 39.2 \text{ ms}$$
$$\text{Clock } 153 <= 8{:}00{:}00.161$$

Thus at the time event 196 is detected and accounting for quantization 192, the difference upper bound 162 and lower bound 161 equals approximately 161 ms-(−11 ms), or 172 ms. Clock management module 102 can divide 172 ms by 2 to calculate 86 ms as the maximum variance. This new variance can be used to calculate time 186, the inferred time (within the maximum variance) that event 196 occurred at computer system 151. The midpoint of the offset between clock 103 and 153 is:

((8:00:27.970+8:00:28.102)/2)−8:00:28.016

8:00:28.066−8:00:28.016=50 ms, which indicates that clock 153 is 50 ms ahead of clock 103.

Alternately, lower and upper bounds can be calculated for when an event is to occur.

Method 300 includes an act of sending an event message including the indication and the calculated time range to one or more other computer systems (act 309). For example, computer system 100 can send event message 197, including event 196 (or an indication of when event 196 is to occur) and time 186, to other computer systems 191. Computer systems that receive event message 197 can make determinations related to the status of computer system 151 based on event message 197. For example, a computer system may receive an indication from computer system 151 that computer system 151 was online at 8:00:15.13. The computer system may subsequently receive event message 197 indicating that computer system 151 is offline. Since 8:00:28.016±86 ms is after 8:00:15.13 the computer system can adjust its state for computer system 151.

It may be that a maximum variance causes overlap with a previously received time, resulting in a potentially conflict as to which event occurred earlier. For example, if time 184 were 8:00:15.47±90.22 ms, the variance causes there to be some chance that event 196 actually occurred before 8:00:15.13. In such cases, a computer system that receives an event message can refer to pre-defined rules (e.g., service level agreements) to resolve conflicts.

Over time, a computer system can calculate an average time for request/reply (or other message) exchanges to complete. Using this average and a pre-defined interval the computer system can estimate a worst case error bound for time differences. For example, referring to FIG. 1 if the average time to complete a request/reply message exchange is 40 ms and a pre-defined interval is 30 seconds, worst case error bound can be calculated to be ±[(40 ms/2)+20 ms+2*((0.5 min/24)*60 min)*(60 sec.)]=81.5 ms.

It may that (at least estimated) values for a clock quantum constraint, a drift rate constraint, and a maximum round trip constraint are known for a system, such as, for example, from averages or even from hardware specifications. A maximum error equation can be used to calculate the maximum variance (between computer systems in an asynchronous distributed system) in what an observing computer system purports the time at an observed computer system to be and what the actually time at the observed computer is.

Figure 4:
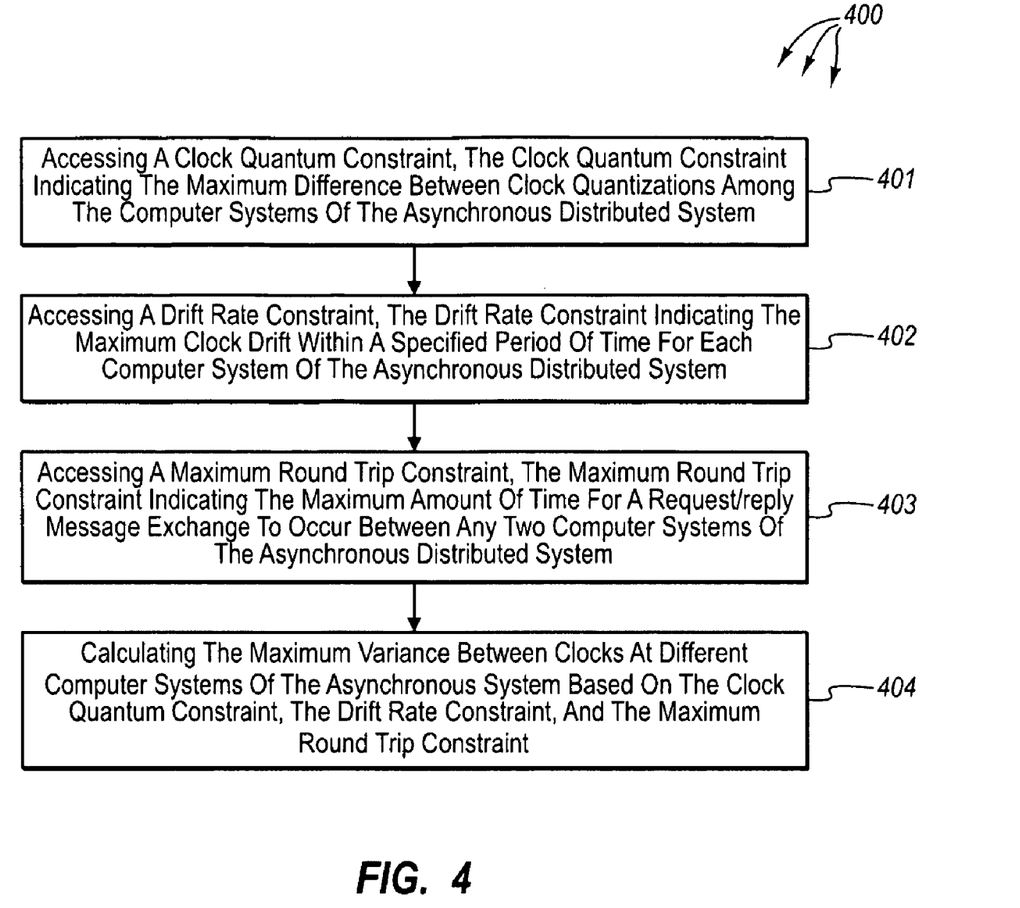
FIG. 4 is a flow chart of an example method for calculating the maximum variance between clocks at different computer systems of an asynchronous distributed system that includes a plurality of computer systems.
Figure 5:
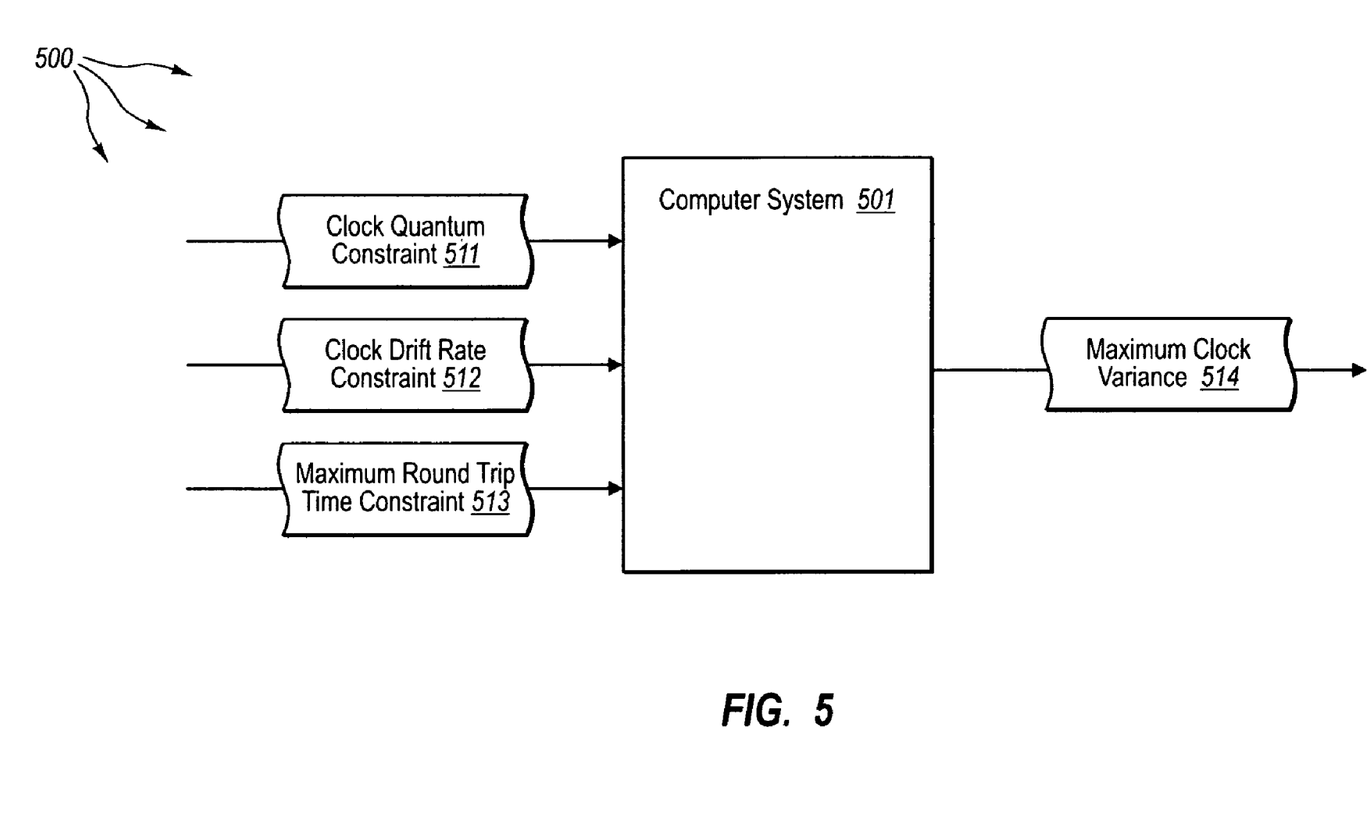
FIG. 5 illustrates an example computer architecture that facilitates calculating the maximum variance between clocks at different computer systems of an asynchronous distributed system that includes a plurality of computer systems.

FIG. 5 illustrates an example computer architecture 500 facilitates calculating the maximum variance between clocks at different computer systems of an asynchronous distributed system that includes a plurality of computer systems. FIG. 4 is a flow chart of an example method 400 for calculating the maximum variance between clocks at different computer systems of an asynchronous distributed system that includes a plurality of computer systems. Method 400 will be described with respect to the components and data in computer architecture 500.

Method 400 includes an act of accessing a clock quantum constraint, the clock quantum constraint indicating the maximum difference between clock quantizations among the computer systems of the asynchronous distributed system. (act 401). For example, computer system 501 can access clock quantum constraint 511, such as, for example, a hardware specification that Q=15 ms.

Method 400 includes an act of accessing a drift rate constraint, the drift rate constraint indicating the maximum clock drift within a specified period of time for each computer system of the asynchronous distributed system (act 402). An observer can learn or be configured for worst case drift of a specified observed. Alternately, an observer can be configured to assume the worst case drift to any observed. For example, computer system 501 can access clock drift rate constraint 512, such as, for example, D<1 minute-of-drift-per-day. Thus, clock drift rate constraint 512 can apply to a specific observed or to any observed.

Method 400 includes an act of accessing maximum round trip constraint, the maximum round trip constraint indicating the maximum amount of time for a request/reply message exchange to occur between any two computer systems of the asynchronous distributed system (act 403). For example, computer system 501 can access maximum round trip constant 513. Round trip constant 513 can be derived, for example, from computer system 101 querying computer system 151 once a minute and round trip times being less than 50 ms.

Method 400 includes an act calculating the maximum variance between clocks at different computer systems of the asynchronous system based on the clock quantum constraint, the drift rate constraint, and the maximum round trip constraint. For example, computer system 501 can calculate maximum clock variance 514 based on clock quantum constraint 511, clock drift rate constraint 512, and round trip constant 513.

A maximum variance equation facilitates an observing computer system knowing the time at an observed computer system at all times within a calculated bound. In some embodiments, the following maximum variance equation can be used:

((receive time−send time)/2)+Q+(2D*(T−AVG(send time, receive time)+Q))

or in the case of pre-determined or specified values:

(R/2)+Q+(2*D*pre-defined request/reply message exchange interval)

Thus, according to the constraints described with respect to method 400, a maximum variance facilitates an observing computer system knowing the time at an observed computer system at all times within (50 ms/2)+15 ms+(2*(1 min/24*60 min)*(60 sec)), which is 25 ms+15 ms+83 ms=123 ms. Further, immediately after a message exchange sequence query, the impact of the clock drift rate constraint D component on the maximum error approaches zero. That is, (2*(~0/24*60 min)*(60 sec))=0. Thus, immediately after a message exchange sequence query, the observing computer system can know the time at the observed computer systems with approximately 25 ms+15 ms+0 ms=40 ms.

Thus, embodiments of the invention facilitate creation of a trustable and practical common time (time of day) reference across a set of peer nodes (observers), such as, for example, members within a common asynchronous (distributed) system. A class of pseudo synchronous system can be created via tracking and accumulating worst case relativistic time skews amongst pairs of nodes (observers), without reference to a common master. Causal direct and indirect relationships can be formed based on ordered interaction between node-pairs. As such, cooperating nodes can essentially guarantee a lower bound on the time-of-day that one node will observe, given an observation on another node. Accordingly, embodiments of the invention can be applied to provide a consistent (essentially safe) view of the worst case (i.e., greatest variance in) current time across such an asynchronous system—without a common external time-of-day clock entity being used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At an observing computer system in an asynchronous distributed system including a plurality of computer system, the observing computer system including a processor and system memory, the asynchronous distributed system having a clock quantum constraint, Q, and a drift rate constraint, D, the clock quantum constraint indicating the maximum difference between clock quantizations among the computer systems of the asynchronous distributed system, the drift rate constraint indicating the maximum clock drift within a specified period of time for each computer system of the asynchronous distributed system, a method for determining the variance between what the observing computer system purports the time at the observed computer system to be and the actual time at the observed computer system, the method comprising:
   an act of participating in one or more message exchanges with the observed computer system, the message exchanges including:
      an act of recording the send time, X(t1), of the clock, X(t), at the observing computer system when a message is sent;
      an act of sending a message to the observed computer system, the message including the recorded send time X(t1);
      an act of subsequently receiving a correlatable message responsive to the message from the observed computer system, the correlatable message containing a time Y(t2) from the clock, Y(t), of the observed computer system;
      an act of recording the received time, X(t3), of the clock, X(t) at the observing computer system when the correlatable message is received; and
      an act of recording the time, Y(t2), from the observed computer system;
   an act of calculating a lower bound for the time at the observed computer system relative to the time of the observing computer system based on the equation:

$Y(t) >= X(t) - (X(t3) - Y(t2) + 2Q) - 2D(X(t) - X(t1))/2 + 2Q);$ an act of calculating an upper bound for the time at the observed computer system relative to the time of the observing computer system based on the equation:

$Y(t) <= X(t) + (Y(t2) - X(t1) + 2Q) + 2D(X(t) - (X(t3) + X(t1))/2 + 2Q);$ an act of calculating the difference between the upper bound and the lower bound; and
   an act of the processor calculating the maximum variance between what the observing computer system purports the time at the observed computer system to be and the actual time at the observed computer system by dividing the calculated difference by an averaging factor.

2. The method as recited in claim 1, further comprising an act of the observing computer system using the calculated maximum variance to formulate safe view of the passage of time at the observed computer system.

3. The method as recited in claim 1, further comprising an act of the observing computer system and the observed computer system agreeing on when an event occurs.

4. The method as recited in claim 3, further wherein the act of the observing computer system and the observed computer system agreeing on when an event occurs comprises an act of the observing computer system detecting the occurrence of a past event at the observed computer system.

5. The method as recited in claim 3, wherein the act of the observing computer system and the observed computer system agreeing on when an event occurs comprises an act of the observing computer system and the observed computer system agreeing on when an event will occur in the future.

6. The method as recited in claim 1, further comprising:
   an act of the observing computer system participating in one or more further message exchanges with the observed computer system; and
   an act of the observing computer system refining one or more of the lower bound and the upper bound based on recorded times corresponding to the one or more further message exchanges.

7. The method as recited in claim 6, further comprising:
   an act of determining the elapsed time between the message exchange and the first of the one or more further message exchanges;
   an act of decaying the calculated time bounds for the observed computer system prior to calculating a time range for the observed computer system, decaying the time bounds including decaying the lower bound and decaying the upper bound based on the elapsed time, the clock drift of the clock at the observing computer system, and the clock drift of the clock at the observed computer system, decaying the calculated time bounds expanding the size of the difference between the lower bound and the upper bound such that the observing computer system indicates decreased accuracy with respect to knowledge of the time at the observed computer system; and
   wherein the act of calculating a time range for the observed computer system based on lower bound and upper bound of the calculated time bound comprises calculating time range for the observed computer system based on the decayed lower time bound and the decayed upper time bound.

8. The method as recited in claim 1, further comprising:
   an act of increasing the maximum variance between that the observing computer system purports the time at the observed computer system to be and the actual time at the observed computer system directly proportional to the increases in elapsed time since participation in the one or more message exchanges and based at least in part on the clock drift constraint.

9. At a computer system, the computer system including a processor and system memory, a method for calculating the maximum variance between clocks at different computer systems of an asynchronous distributed system that includes a plurality of computer systems, the method comprising:
   an act of accessing a clock quantum constraint, Q, the clock quantum constraint indicating the maximum difference between clock quantizations among the computer systems of the asynchronous distributed system;
   an act of accessing a drift rate constraint, D, the drift rate constraint indicating the maximum clock drift within a specified period of time for each computer system of the asynchronous distributed system;

an act of accessing a maximum round trip constraint, the maximum round trip constraint indicating the maximum amount of time for a request/reply message exchange to occur between any two computer systems of the asynchronous distributed system; and an act of the processor calculating the maximum variance, Vmax, between clocks at different computer systems of the asynchronous system based on the clock quantum constraint, the drift rate constraint, and the maximum round trip constraint according to the equation:

$$V\max = ((t(2)-t(1))/2 + Q + (2D^*(T - \operatorname{Avg}(t(1), t(2)) + Q)),$$

where t(1) is the send time of the request and t(2) is the receive time of the response at a first computer system in the asynchronous distributed system.

10. The method as recited in claim 9, wherein one or more of the clock quantum constraint and drift rate constraint are defined in a specification for the asynchronous distributed system.

11. At an observing computer system, the observing computer system including a processor and system memory, a method for indicating the time an event occurred at an observed computer system, the method comprising:

an act of participating in one or more message exchanges with the observed computer system, each message exchange including:

an act of recording the time, X(t1), of the clock, X(t), at the observing computer system when a request message is sent;

an act of sending one or more request messages to the observed computer system, each request message including a corresponding recorded send time;

an act of subsequently receiving one or more reply messages responsive to the one or more request messages from the observed computer system, each reply message containing a time, Y(t2), from the clock, Y(t), of the observed computer system; and an act of recording the time, X(t3), of the clock at the observing computer system when a reply message is received;

an act of calculating time bounds for the clock, Y(t), of the observed computer system relative to the time, X(t), of the observing computer system based on the one or more message exchanges, the time bounds configured to be applied to the time at the observing computer system to purport a specified time range at the observed computer system subsequent to the one or more message exchanges, the time bounds including:

a lower time bound representing the bottom of the calculated time bounds, the lower time bound calculated using the equation:

$$Y(t) >= X(t) - (X(t3) - Y(t2) + 2Q) - 2D(X(t) - X(t1))/2 + 2Q);$$

and an upper time bound representing the top of the calculated time bounds, the upper time bound calculated using the equation:

$$Y(t) <= X(t) + (Y(t2) - X(t1) + 2Q) + 2D(X(t) - (X(t3) + X(t1))/2 + 2Q);$$

an act of the processor receiving an indication, the indication selected from among: a) an indication of the occurrence of a past event at the observed computer system and b) an indication of when an event is to occur at the observed computer system, subsequent to the one or more message exchanges;

an act of the processor calculating a time range for the observed computer system, the time range indicative of a) when the event occurred or b) when the event is to occur at the observed computer system, the time range calculated based on a time at the observing computer system when the indication was received and based on the lower bound and the upper bound of the calculated time bound; and an act of sending an event message including the indication and the calculated time range to one or more other computer systems.

12. The method as recited in claim 11, wherein the act of calculating time bounds for the observed computer system relative to the time of the observing computer system based on the one or more messages comprises an act of setting the lower bound to a value based at least in part on the smallest difference between the time recorded for sending a request message and the time from the observed computer system included in a corresponding reply message in any of the one or more message exchanges.

13. The method as recited in claim 12, wherein the act of setting the lower bound to a value comprises an act of setting the lower bound to a value based at least in part on an indication of a difference between the quantization of the clock at the observing computer system and the quantization of the clock at the observed computer system.

14. The method as recited in claim 12, wherein the act of setting the lower bound to a value comprises an act of setting the lower bound to a value based at least in part on the clock drift of the clock at the observing computer system and the clock drift of the clock at the observed computer system.

15. The method as recited in claim 11, wherein that act of calculating time bounds for the observed computer system relative to the time of the observing computer system based on the one or more request/reply messages comprises an act of setting the upper bound to a value based at least in part on the smallest difference between the time recorded for receiving a reply message and the time from the observed computer system included in the reply message in any of the one or more request/reply message exchanges.

16. The method as recited in claim 15, wherein the act of setting the upper bound to a value comprises an act of setting the upper bound to a value based at least in part on an indication of a difference between the quantization of the clock at the observing computer system and the quantization of the clock at the observed computer system.

17. The method as recited in claim 15, wherein the act of setting the upper bound to a value comprises an act of setting the upper bound to a value based at least in part on the clock drift of the clock at the observing computer system and the clock drift of the clock at the observed computer system.

18. The method as recited in claim 11, further comprising:

an act of determining the elapsed time between the last message exchange of the one or more message exchanges and the time the indication of the occurrence of the event was received;

an act of decaying the calculated time bounds for the observed computer system prior to calculating a time range for the observed computer system, decaying the time bounds including decaying the lower bound and decaying the upper bound based on the elapsed time, the clock drift of the clock at the observing computer system, and the clock drift of the clock at the observed computer system, decaying the calculated time bounds expanding the size of the difference between the lower bound and the upper bound such that the observing computer system indicates decreased accuracy with respect to knowledge of the time at the observed computer system; and wherein the act of calculating a time range for the observed computer system based on lower bound and upper bound of the calculated time bound comprises calculating time range for the observed computer system based on the decayed lower time bound and the decayed upper time bound.

19. The method as recited in claim 18, further comprising:

an act of the observing computer system participating in a second one or more request/reply message exchanges with the observed computer system subsequent to sending the event message; and an act of the observing computer system refining the value of at least one of the decayed lower bound and the decayed upper bound in response to participating in the second one or more message exchanges so as to indicate increased accuracy with respect to knowledge of the time at the observed computer system.

20. The method as recited in claim 11, further comprising:

an act of the observed computer system participating in the one or more message exchanges including for each message exchange:
  an act of receiving a request message to the observed computer system;
  an act of inserting a time for the clock at the observing computer system into a reply message responsive to the received request message; and
  an act of sending the reply message to the observing computer system.

21. The method as recited in claim 20, wherein the act of inserting a time for the clock at the observing computer system into a reply message comprises an act of the observed computer system inserting a time indicative of when the received request message from processed at the observed computer system.

22. The method as recited in claim 11, wherein the asynchronous distributed system is a peer-to-peer system.

* * * * *